(12) United States Patent
Schwarz

(10) Patent No.: US 11,473,497 B2
(45) Date of Patent: Oct. 18, 2022

(54) ENGINE BLEED SYSTEM WITH MOTORIZED COMPRESSOR

(71) Applicant: Hamilton Sundstrand Corporation, Windsor Locks, CT (US)

(72) Inventor: Frederick M. Schwarz, Glastonbury, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 769 days.

(21) Appl. No.: 15/070,476

(22) Filed: Mar. 15, 2016

(65) Prior Publication Data
US 2017/0268423 A1 Sep. 21, 2017

(51) Int. Cl.
| F02C 9/18 | (2006.01) |
| F02C 6/08 | (2006.01) |
| B64D 15/02 | (2006.01) |
| F02K 3/06 | (2006.01) |
| B64D 13/00 | (2006.01) |

(Continued)

(52) U.S. Cl.
CPC ............... F02C 6/08 (2013.01); B64D 13/00 (2013.01); B64D 15/02 (2013.01); B64D 15/04 (2013.01); B64D 33/02 (2013.01); F02C 3/04 (2013.01); F02C 9/18 (2013.01); F02K 3/06 (2013.01); H02K 7/1823 (2013.01); B64D 2033/0233 (2013.01); F05D 2270/07 (2013.01);

(Continued)

(58) Field of Classification Search
CPC ... F02C 9/18; F02C 7/047; F02C 6/08; B64D 2013/0618; B64D 15/04; B64D 2013/0607; F01D 25/02; F04D 15/0011
See application file for complete search history.

(56) References Cited

U.S. PATENT DOCUMENTS

| 2,747,365 A | * | 5/1956 | Rainbow | ................ F02C 7/047 60/39.093 |
| 4,041,695 A |   | 4/1977 | Harper et al. | |

(Continued)

FOREIGN PATENT DOCUMENTS

| CN | 102648127 A | 8/2012 |
| CN | 103047010 A | 4/2013 |

(Continued)

OTHER PUBLICATIONS

Marek et al "Low Emission Hydrogen Combustors for Gas Turbines Using Lean Direct Injection" 41st AIAA/ASME/SAE/ASEE Joint Propulsion Conference and Exhibit AIAA-2005-3776, Tucson, Arizona, Jul. 10-13, 2005, pp. 1-27 (Year: 2005).*

(Continued)

Primary Examiner — Ted Kim
(74) Attorney, Agent, or Firm — Cantor Colburn LLP

(57) ABSTRACT

An engine bleed control system for a gas turbine engine of an aircraft is provided. The engine bleed control system includes an engine bleed tap coupled to a fan-air source or a compressor source of a lower pressure compressor section before a highest pressure compressor section of the gas turbine engine and a motorized compressor in fluid communication with the engine bleed tap. The engine bleed control system also includes a controller operable to selectively drive the motorized compressor to boost a bleed air pressure as pressure augmented bleed air and control delivery of the pressure augmented bleed air to an aircraft use.

18 Claims, 5 Drawing Sheets

(51) Int. Cl.
  *B64D 15/04* (2006.01)
  *B64D 33/02* (2006.01)
  *F02C 3/04* (2006.01)
  *H02K 7/18* (2006.01)

(52) U.S. Cl.
  CPC .............. *F05D 2270/303* (2013.01); *F05D 2270/3013* (2013.01); *Y02T 50/60* (2013.01)

(56) References Cited

U.S. PATENT DOCUMENTS

| | | | |
|---|---|---|---|
| 4,263,786 A * | 4/1981 | Eng | B64D 13/06 |
| | | | 62/87 |
| 5,063,963 A | 11/1991 | Smith | |
| 5,114,100 A * | 5/1992 | Rudolph | B64C 21/06 |
| | | | 244/130 |
| 5,137,230 A | 8/1992 | Coffinberry | |
| 6,189,324 B1 | 2/2001 | Williams et al. | |
| 6,305,156 B1 | 10/2001 | Lui | |
| 6,634,596 B2 | 10/2003 | Albero et al. | |
| 7,936,082 B2 * | 5/2011 | Boudyaf | B64D 15/12 |
| | | | 219/202 |
| 8,063,501 B2 | 11/2011 | Finney | |
| 8,176,725 B2 * | 5/2012 | Norris | F02C 3/107 |
| | | | 60/226.1 |
| 8,484,983 B2 | 7/2013 | Gao et al. | |
| 8,529,189 B2 | 9/2013 | Brown et al. | |
| 8,904,805 B2 | 12/2014 | Hipsky et al. | |
| 8,967,528 B2 | 3/2015 | Mackin et al. | |
| 9,062,604 B2 | 6/2015 | Defrancesco | |
| 10,054,051 B2 | 8/2018 | Foutch et al. | |
| 2004/0129835 A1 | 7/2004 | Atkey et al. | |
| 2008/0047276 A1 | 2/2008 | Baer et al. | |
| 2010/0107594 A1 | 5/2010 | Coffinberry et al. | |
| 2010/0247306 A1 * | 9/2010 | Merry | F02C 9/18 |
| | | | 415/208.2 |
| 2011/0168843 A1 | 7/2011 | Calder | |
| 2012/0119518 A1 | 4/2012 | Shockling et al. | |
| 2012/0122631 A1 | 5/2012 | Galivel et al. | |
| 2012/0186267 A1 | 7/2012 | Coffinberry et al. | |
| 2013/0031912 A1 | 2/2013 | Finney et al. | |
| 2013/0098067 A1 | 4/2013 | Suciu et al. | |
| 2013/0164115 A1 * | 6/2013 | Sennoun | F02C 7/185 |
| | | | 415/1 |
| 2013/0174573 A1 | 7/2013 | Hipsky et al. | |
| 2013/0341465 A1 | 12/2013 | Massey et al. | |
| 2014/0196469 A1 * | 7/2014 | Finney | B64D 13/06 |
| | | | 60/785 |
| 2014/0250898 A1 | 9/2014 | Mackin et al. | |
| 2015/0059356 A1 | 3/2015 | Bruno et al. | |
| 2015/0065023 A1 | 3/2015 | Bruno | |
| 2015/0104289 A1 | 4/2015 | Mackin et al. | |
| 2015/0251766 A1 | 9/2015 | Atkey | |
| 2015/0275758 A1 * | 10/2015 | Foutch | F02C 7/047 |
| | | | 60/779 |
| 2015/0275769 A1 | 10/2015 | Foutch et al. | |
| 2015/0307183 A1 | 10/2015 | Bruno et al. | |
| 2015/0354464 A1 | 12/2015 | Hillel et al. | |
| 2017/0268430 A1 | 9/2017 | Schwarz | |
| 2017/0268431 A1 | 9/2017 | Schwarz | |
| 2018/0058973 A1 | 3/2018 | Everwyn et al. | |

FOREIGN PATENT DOCUMENTS

| | | |
|---|---|---|
| CN | 104420999 A | 3/2015 |
| EP | 1923575 | 5/2008 |
| EP | 2492199 | 8/2012 |
| EP | 2557038 | 2/2013 |
| EP | 2848534 | 3/2015 |
| EP | 2960467 | 12/2015 |
| EP | 3127812 | 2/2017 |
| JP | 2001010596 | 1/2001 |
| WO | 2009068265 | 6/2009 |

OTHER PUBLICATIONS

U. S. B Urea U of Mines; Pittsburgh Mining and Safety Research Center "Summary of Ignition Properties of Jet Fuels and Other Aircraft-Combustible Fluids"; AFAPL-TR-75-70; Sep. 1975, pp. 1-54 (Year: 1975).*
EP Application No. 17160033.1 Extended Search Report dated Jul. 26, 2017, 8 pages.
EP Application No. 17160296.4 Extended EP Search Report dated Aug. 1, 2017, 7 pages.
EP Application No. 17160865.6 Extended EP Search Report dated Jul. 21, 2017, 11 pages.
The Engineering ToolBox (https://www.engineeringtoolbox.com/fuels-ignition-termperatures-d_171.html) Table 1, Jun. 13, 2018, p. 1.
EP Application No. 17160033.1 Office Action dated Sep. 10, 2018, 4 pages.
EP Application No. 17160865.6 Office Action dated Oct. 1, 2018, 4 pages.
EP Application No. 17160296.4 Office Action dated Mar. 20, 2019, 1 page.
K. Bevill, GE powers turbines with ethanol in Brazil. Ethanol Producer Magazine. Posted Oct. 7, 2010. Accessed at http://www.ethanolproducer.com/articles/7031/ge-powers-turbines-with-ethanol-in-brazil/ on Feb. 3, 2019 (Year: 2010), 2 pages.
First Office Action; CN 201710150475.2; dated Jul. 10, 2020; 14 pages.
CN Application No. 201710151066.4 Third Office Action dated Jul. 2, 2021 with EnglishTranslation, 19 pages.
CN Application No. 201710151066.4 Second Office Action dated Mar. 3, 2021 with English Translation, 17 pages.
EP Application No. 17160296.4 Office Action dated Mar. 29, 2021, 3 pages.

* cited by examiner

ENGINE BLEED SYSTEM WITH MOTORIZED COMPRESSOR

BACKGROUND

This disclosure relates to gas turbine engines, and more particularly to an engine bleed system with a motorized compressor.

Gas turbine engines are used in numerous applications, one of which is for providing thrust to an aircraft. Compressed air is typically tapped at a high pressure location near the combustor for auxiliary uses, such as environmental control of the aircraft. However, this high pressure air is typically hotter than can safely be supported by ductwork and delivery to the aircraft. Thus, a pre-cooler or heat exchanger is used to cool high-temperature engine bleed air and is typically located near the engine such that excessively hot air is not ducted through the wing of the aircraft for safety reasons. Diverting higher pressure and higher temperature air from the engine beyond the pressure needed reduces engine efficiency. Further, heat exchangers used to cool engine bleed air add to overall aircraft weight, which also reduces fuel burn efficiency.

BRIEF DESCRIPTION

According to an embodiment, an engine bleed control system for a gas turbine engine of an aircraft is provided. The engine bleed control system includes an engine bleed tap coupled to a fan-air source of the gas turbine engine and a motorized compressor in fluid communication with the engine bleed tap. The engine bleed control system also includes a controller operable to selectively drive the motorized compressor to boost a bleed air pressure from the fan-air source as pressure augmented bleed air and control delivery of the pressure augmented bleed air to an aircraft use.

According to another embodiment, an engine bleed control system for a gas turbine engine of an aircraft is provided. The engine bleed control system includes an engine bleed tap coupled to a compressor source of a lower pressure compressor section before a highest pressure compressor section of the gas turbine engine and a motorized compressor in fluid communication with the engine bleed tap. The engine bleed control system also includes a controller operable to selectively drive the motorized compressor to boost a bleed air pressure from the compressor source as pressure augmented bleed air and control delivery of the pressure augmented bleed air to an aircraft use.

According to a further embodiment, a method of controlling an engine bleed system for a gas turbine engine of an aircraft is provided. The method includes establishing fluid communication between a motorized compressor and an engine bleed tap at a fan-air source or a compressor source of a lower pressure compressor section before a highest pressure compressor section of the gas turbine engine. The motorized compressor is selectively driven to boost a bleed air pressure from the engine bleed tap as pressure augmented bleed air. Delivery of the pressure augmented bleed air to an aircraft use is controlled.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

Figure 1:
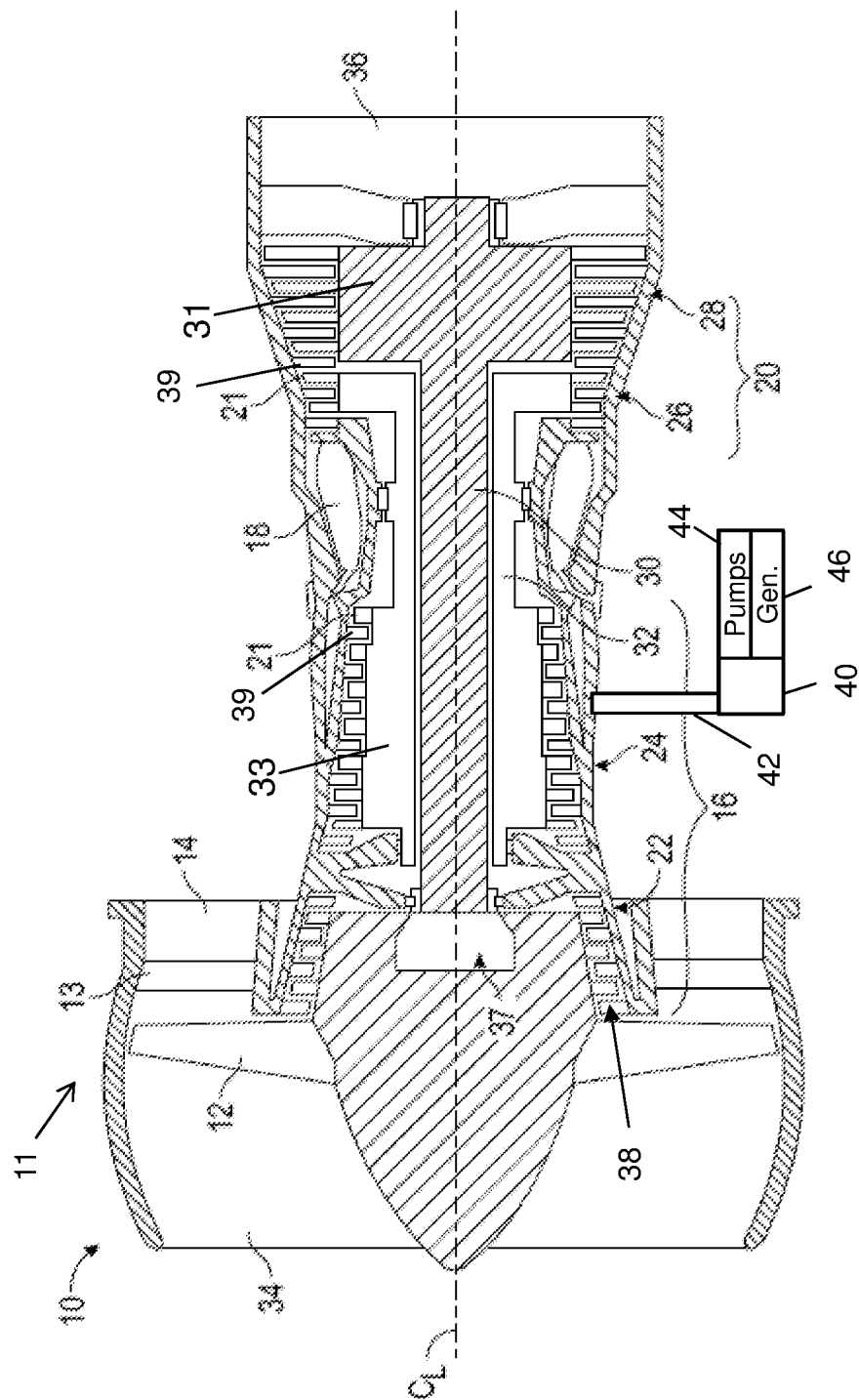
FIG. 1 is a cross-sectional view of a gas turbine engine.

While the above-identified drawing figures set forth one or more embodiments of the invention, other embodiments are also contemplated. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present disclosure may include features and components not specifically shown in the drawings. Like reference numerals identify similar structural elements.

DETAILED DESCRIPTION

Various embodiments of the present disclosure are related to engine bleed control for a gas turbine engine. Embodiments of this disclosure may be applied on any turbomachinery from which compressed air is tapped off for auxiliary uses. For example, gas turbine engines are rotary-type combustion turbine engines built around a power core made up of a compressor, combustor and turbine, arranged in flow series with an upstream inlet and downstream exhaust. The compressor compresses air from the inlet, which is mixed with fuel in the combustor and ignited to generate hot combustion gas. The turbine extracts energy from the expanding combustion gas, and drives the compressor via a common shaft. Energy is delivered in the form of rotational energy in the shaft, reactive thrust from the exhaust, or both. Compressed air can be extracted from various stages as bleed air.

Gas turbine engines provide efficient, reliable power for a wide range of applications, including aviation and industrial power generation. Smaller-scale engines such as auxiliary power units typically utilize a one-spool design, with co-rotating compressor and turbine sections. Larger-scale jet engines and industrial gas turbines are generally arranged into a number of coaxially nested spools, which operate at different pressures and temperatures, and rotate at different speeds.

The individual compressor and turbine sections in each spool are subdivided into a number of stages, which are formed of alternating rows of rotor blade and stator vane airfoils. The airfoils are shaped to turn, accelerate and compress the working fluid flow, or to generate lift for conversion to rotational energy in the turbine.

Aviation applications include turbojet, turbofan, turboprop and turboshaft engines. In turbojet engines, thrust is generated primarily from the exhaust. Modern fixed-wing aircraft generally employ turbofan and turboprop designs, in which the low pressure spool is coupled to a propulsion fan or propeller in turbofan with two turbines. Alternatively, in turbofans with three turbines, one turbine drives the fan, one turbine drives the first compressor section and the third turbine drives the second compressor section. Turboshaft engines are typically used on rotary-wing aircraft, including helicopters.

Turbofan engines are commonly divided into high and low bypass configurations. High bypass turbofans generate thrust primarily from the fan, which drives airflow through a bypass duct oriented around the engine core. This design is common on commercial aircraft and military transports, where noise and fuel efficiency are primary concerns. Low bypass turbofans generate proportionally more thrust from the exhaust flow, providing greater specific thrust for use on high-performance aircraft, including supersonic jet fighters. Unducted (open rotor) turbofans and ducted propeller engines are also known, in a variety of counter-rotating and aft-mounted configurations.

Referring now to FIG. 1, a cross-sectional view of a gas turbine engine 10, in a turbofan configuration is illustrated. The illustrated gas turbine engine 10 includes a fan section 11 with a propulsion fan 12 mounted inside a bypass duct 14 upstream of a fan exit guide vane 13. A power core of the engine is formed by a compressor section 16, a combustor 18 and a turbine section 20. Rotor blades (or airfoils) 21 in the compressor section 16 and/or the turbine section 20 are arranged in stages 38 with corresponding stator vanes (or airfoils) 39, where each stage 38 includes a rotor blade 21 and stator vane 39 pair.

In the two-spool, high bypass configuration of FIG. 1, compressor section 16 includes a low pressure compressor 22 (a lower pressure compressor section) and a high pressure compressor 24 (a highest pressure compressor section). The turbine section 20 includes high a pressure turbine 26 and a low pressure turbine 28.

The low pressure compressor 22 is rotationally coupled to the low pressure turbine 28 via a low pressure shaft 30, thereby forming the low pressure spool or low spool 31. High pressure compressor 24 is rotationally coupled to the high pressure turbine 26 via a high pressure shaft 32, forming the high pressure spool or high spool 33.

During operation of the gas turbine engine 10, the fan 12 accelerates air flow from an inlet 34 through bypass duct 14, generating thrust. The core airflow is compressed in the low pressure compressor 22 and the high pressure compressor 24 and then the compressed airflow is mixed with fuel in the combustor 18 and ignited to generate combustion gas.

The combustion gas expands to drive the high and low pressure turbines 26 and 28, which are rotationally coupled to high pressure compressor 24 and low pressure compressor 22, respectively. Expanded combustion gases exit through exhaust nozzle 36, which is shaped to generate additional thrust from the exhaust gas flow.

In advanced turbofan designs with a low pressure turbine and a high pressure turbine, the low pressure shaft 30 may be coupled to a low pressure compressor and then to a fan 12 via geared drive mechanism 37, providing improved fan speed control for increased efficiency and reduced engine noise as a geared turbofan engine. Propulsion fan 12 may also function as a first-stage compressor for gas turbine engine 10, with low pressure compressor 22 performing as an intermediate-stage compressor or booster in front of the high pressure compressor. Alternatively, the low pressure compressor stages are absent, and air from fan 12 is provided directly to high pressure compressor 24, or to an independently rotating intermediate compressor spool.

An engine accessory gearbox 40 is mechanically coupled via a tower shaft 42 to a rotating portion of the gas turbine engine 10, such as the high pressure spool 33. Rotation of various engine accessories, such as pumps 44 and electric generators 46 (also referred to as engine generators 46), can be driven through the engine accessory gearbox 40 as depicted schematically in FIG. 1. The engine accessory gearbox 40 can alternatively be coupled to low spool 31, and thus the electric generators 46 may also be referred to as low spool generators powered by rotation of the low pressure turbine 28 (i.e., lowest pressure turbine).

The gas turbine engine 10 may have a range of different shaft and spool geometries, including one-spool, two-spool and three-spool configurations, in both co-rotating and counter-rotating designs. Gas turbine engine 10 may also be configured as a low bypass turbofan, an open-rotor turbofan, a ducted or un-ducted propeller engine, or an industrial gas turbine.

Figure 5:
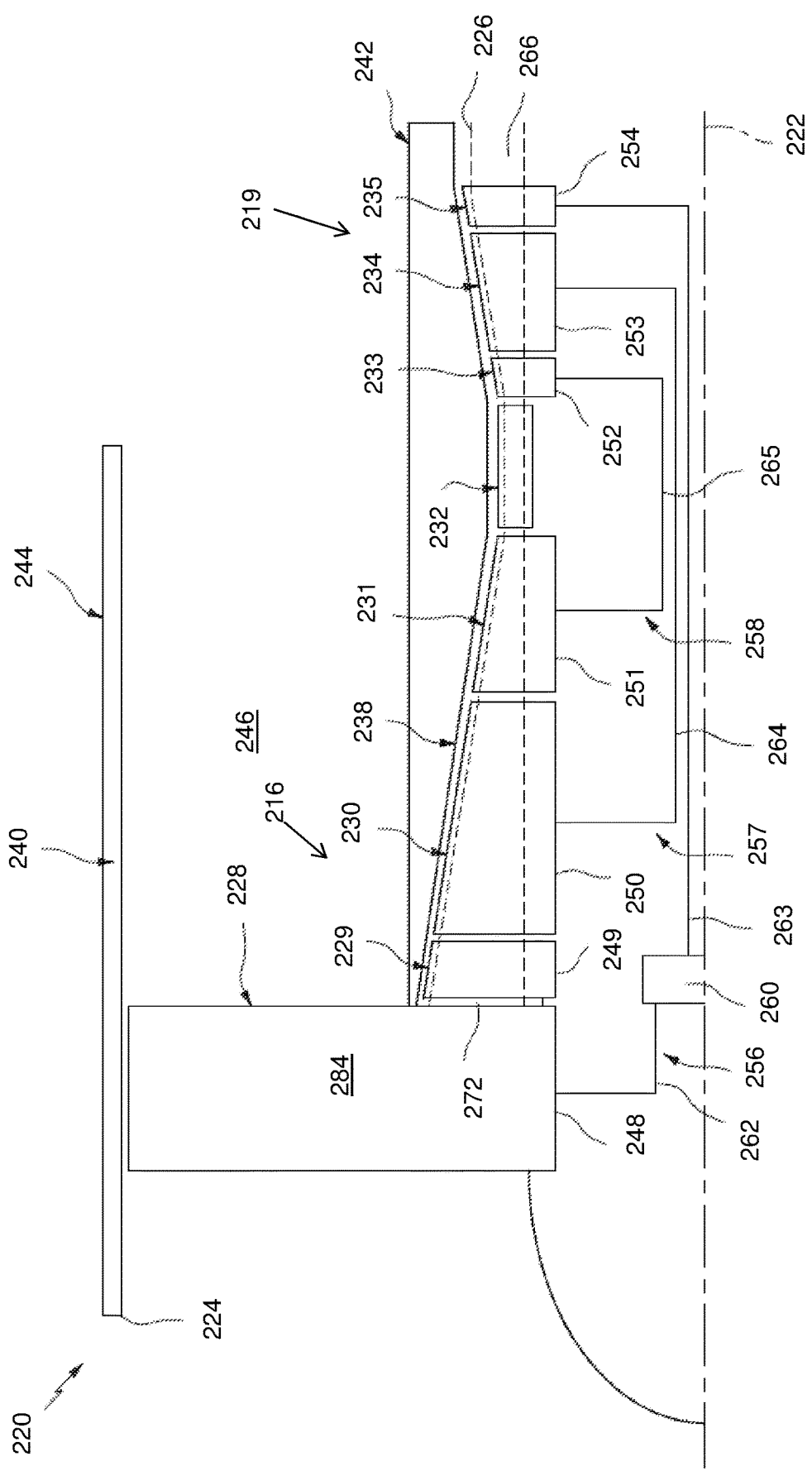
FIG. 5 is a partial schematic view of another example of a gas turbine engine.

FIG. 5 depicts another example of a gas turbine engine 220 in a geared turbofan configuration. The gas turbine engine 220 extends along an axial centerline 222 between an upstream airflow inlet 224 and a downstream airflow exhaust 226. The gas turbine engine 220 includes a fan section 228, a compressor section 216, a combustor section 232 and a turbine section 219. The compressor section 216 includes a low pressure compressor (LPC) section 229, an intermediate pressure compressor (IPC) section 230 and a high pressure compressor (HPC) section 231, where the LPC section 229 and IPC section 230 are lower pressure compressor section before the highest pressure compressor section of HPC section 231. The turbine section 219 includes a high pressure turbine (HPT) section 233, an intermediate pressure turbine (IPT) section 234 and a low pressure turbine (LPT) section 235.

The engine sections 228-235 are arranged sequentially along the centerline 222 within an engine housing 236. This housing 236 includes an inner (e.g., core) casing 238 and an outer (e.g., fan) casing 240. The inner casing 238 houses the LPC section 229 and the engine sections 230-235, which form a multi-spool core of the gas turbine engine 220. The outer casing 240 houses at least the fan section 228. The engine housing 236 also includes an inner (e.g., core) nacelle 242 and an outer (e.g., fan) nacelle 244. The inner nacelle 242 houses and provides an aerodynamic cover for the inner casing 238. The outer nacelle 244 houses and provides an aerodynamic cover the outer casing 240. The outer nacelle 244 also overlaps a portion of the inner nacelle 242 thereby defining a bypass gas path 246 radially between the nacelles 242 and 244. The bypass gas path 246, of course, may also be partially defined by the outer casing 240 and/or other components of the gas turbine engine 220.

Each of the engine sections 228-231 and 233-235 includes a respective rotor 248-254. Each of these rotors 248-254 includes a plurality of rotor blades (e.g., fan blades, compressor blades or turbine blades) arranged circumferentially around and connected to one or more respective rotor disks. The rotor blades, for example, may be formed integral with or mechanically fastened, welded, brazed, adhered and/or otherwise attached to the respective rotor disk(s).

The rotors 248-254 are respectively configured into a plurality of rotating assemblies 256-258. The first rotating assembly 256 includes the fan rotor 248, the LPC rotor 249 and the LPT rotor 254. The first rotating assembly 256 can also include a gear train 260 and one or more shafts 262 and 263, which gear train 260 may be configured as an epicyclic gear train with a planetary or star gear system. The LPC rotor 249 is connected to the fan rotor 248. The fan rotor 248 is connected to the gear train 260 through the fan shaft 262. The LPC rotor 249 is therefore connected to the gear train 260 through the fan rotor 248 and the fan shaft 262. The gear train 260 is connected to and driven by the LPT rotor 254 through the low speed shaft 263.

The second rotating assembly 257 includes the IPC rotor 250 and the IPT rotor 253. The second rotating assembly 257 also includes an intermediate speed shaft 264. The IPC rotor 250 is connected to and driven by the IPT rotor 253 through the intermediate speed shaft 264.

The third rotating assembly 258 includes the HPC rotor 251 and the HPT rotor 252. The third rotating assembly 258 also includes a high speed shaft 265. The HPC rotor 251 is connected to and driven by the HPT rotor 252 through the high speed shaft 265.

One or more of the shafts 262-265 may be coaxial about the centerline 222. One or more of the shafts 263-265 may also be concentrically arranged. The low speed shaft 263 is disposed radially within and extends axially through the intermediate speed shaft 264. The intermediate speed shaft 264 is disposed radially within and extends axially through the high speed shaft 265. The shafts 262-265 are rotatably supported by a plurality of bearings; e.g., rolling element and/or thrust bearings. Each of these bearings is connected to the engine housing 236 (e.g., the inner casing 238) by at least one stationary structure such as, for example, an annular support strut.

During operation, air enters the gas turbine engine 220 through the airflow inlet 224. This air is directed through the fan section 228 and into a core gas path 266 and the bypass gas path 246. The core gas path 266 flows sequentially through the engine sections 229-235. The air within the core gas path 266 may be referred to as "core air". The air within the bypass gas path 246 may be referred to as "bypass air".

The core air is compressed by the compressor rotors 249-251 and directed into the combustor section 232. Fuel is injected into the combustor section 232 and mixed with the compressed core air to provide a fuel-air mixture. This fuel air mixture is ignited and combustion products thereof flow through and sequentially cause the turbine rotors 252-254 to rotate. The rotation of the turbine rotors 252-254 respectively drive rotation of the compressor rotors 251-249 and, thus, compression of the air received from a core airflow inlet. The rotation of the turbine rotor 254 also drives rotation of the fan rotor 248, which propels bypass air through and out of the bypass gas path 246. The propulsion of the bypass air may account for a majority of thrust generated by the gas turbine engine 220, e.g., more than seventy-five percent (75%) of engine thrust. The gas turbine engine 220 of the present disclosure, however, is not limited to the foregoing exemplary thrust ratio. Further, although the example of FIG. 5 includes gear train 260, the gear train 260 can be eliminated in other embodiments that include two or more spools.

Figure 2:
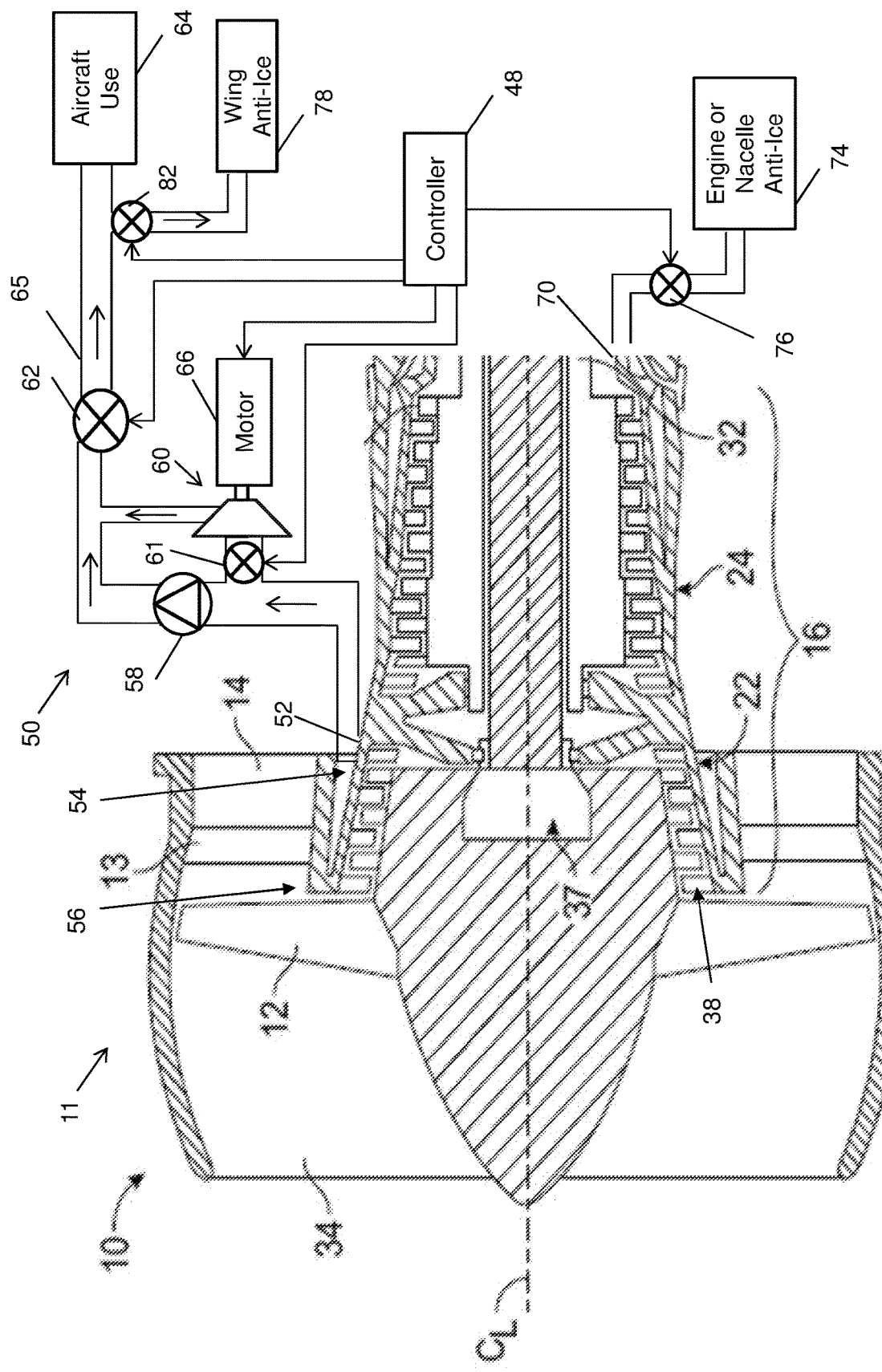
FIG. 2 is a partial view of an engine bleed system according to an embodiment of the disclosure.
Figure 3:
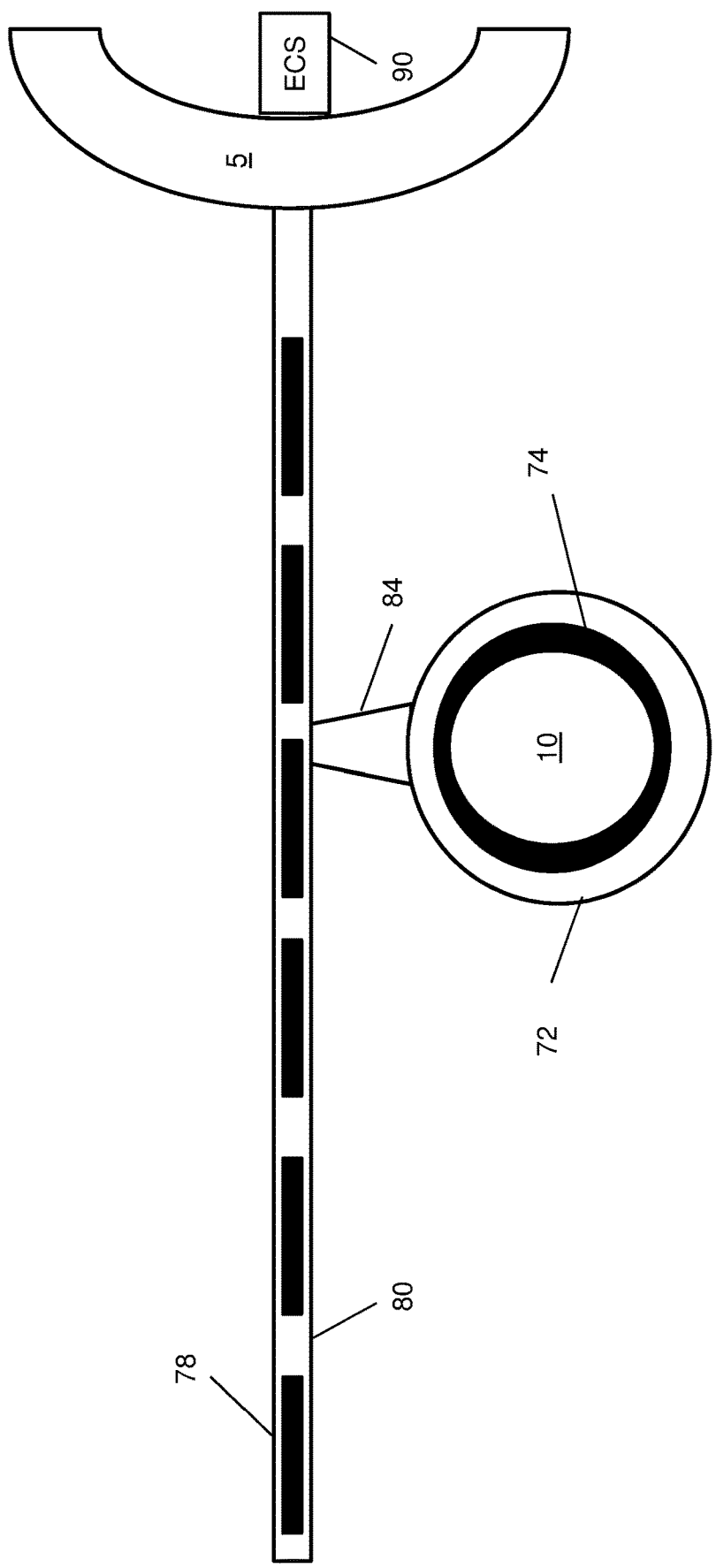
FIG. 3 is a schematic view of an aircraft ice control system according to an embodiment of the disclosure.

FIG. 2 is a partial view of an engine bleed system 50 (also referred to as an engine bleed control system) according to an embodiment. In the example of FIG. 2, an engine bleed tap 52 is coupled to a compressor source 54 of the low pressure compressor 22 of the gas turbine engine 10 of FIG. 1. Alternatively, the engine bleed tap 52 can be coupled to a fan-air source 56 that is upstream from the low pressure compressor 22 to extract air from fan 12. In some embodiments, the low pressure compressor source 54 is located at a compressor section 16 with less than or equal to eight stages 38 of rotor blade 21 and stator vane 39 pairs from fan section 11 of the gas turbine engine 10. In some embodiments, the low pressure compressor source 54 is the lowest pressure compressor source of compressor section 16. Bleed air from engine bleed tap 52 is routed through a check valve 58 and may be combined with a compressed flow from the engine bleed tap 52 that is further compressed by a motorized compressor 60 as pressure augmented bleed air. A valve 61 can selectively establish a flow from the engine bleed tap 52 through the motorized compressor 60 to further control characteristics of the pressure augmented bleed air. A valve 62 can control delivery of the pressure augmented bleed air to an aircraft use 64 through ducts 65. The aircraft use 64 may be an environmental control system 90 of an aircraft 5, as best seen in FIG. 3. The motorized compressor 60 can be selectively driven by a motor 66, which can be an electric motor. The motor 66 may receive electrical power from the electric generators 46 based on rotation of the low spool 31, for example. Alternatively, the motor 66 can be powered by another electrical power source, such as a generator, battery, auxiliary power unit, or external/ground-based power.

In embodiments, a pneumatic bleed 70 for anti-icing a nacelle inlet 72 (FIG. 3) of the gas turbine engine 10 is provided for an engine anti-icing system 74. The engine anti-icing system 74 can provide anti-icing for engine components and/or nacelle components and can exceed 400 degrees Fahrenheit (204 degrees Celsius). The pneumatic bleed 70 can be at a different engine stage than the engine bleed tap 52, e.g., higher temperature/compression point downstream, but need not be located at the highest stage of compression. A valve 76 can be selectively actuated by a controller 48 to enable the engine anti-icing system 74. In some embodiments, a wing anti-icing system 78 in wing 80 of the aircraft 5 is powered by an engine generator 46, i.e., electric anti-icing. In alternate embodiments, the controller 48 is operable to control delivery of a portion of the pressure augmented bleed air to the wing anti-icing system 78 of the aircraft 5 using valve 82. The controller 48 may also control valves 61, 62, as well as other components, such as the motor 66.

The controller 48 may include memory to store instructions that are executed by a processor. The executable instructions may be stored or organized in any manner and at any level of abstraction, such as in connection with a controlling and/or monitoring operation of one or more systems of the gas turbine engine 10 of FIG. 1. The processor can be any type of central processing unit (CPU), including a general purpose processor, a digital signal processor, a microcontroller, an application specific integrated circuit (ASIC), a field programmable gate array, or the like. Also, in embodiments, the memory may include random access memory (RAM), read only memory (ROM), or other electronic, optical, magnetic, or any other computer readable medium onto which is stored data and control algorithms in a non-transitory form. The controller 48 can be embodied in an individual line-replaceable unit, within a control system (e.g., in an electronic engine control), and/or distributed between multiple electronic systems.

In the example of FIG. 2, the engine bleed tap 52 is installed at a lower temperature engine stage such that in combination with the motorized compressor 60, a maximum temperature of the pressure augmented bleed air is held below an auto-ignition point of a fuel-air mixture at all flight conditions of the gas turbine engine 10. For instance, the maximum temperature can be established as 400 degrees Fahrenheit (204 degrees Celsius) for 0.25 mach and a 120 degree Fahrenheit day. The motorized compressor 60 may be sized to boost bleed air by about 15 to 20 pounds per square inch (psi) when used. The controller 48 may observe various aircraft operating conditions to determine when the motorized compressor 60 is needed and to adjust the output of the motorized compressor 60. By selecting a source of engine bleed air that is already pressurized greater than ambient while also having a temperature that is less than the auto-ignition point of a fuel-air mixture, the motorized compressor 60 can be modestly sized to augment engine bleed air while not exceeding the auto-ignition point or maximum pressure constraints.

While a specific configuration is depicted in FIG. 2, other configurations are contemplated within the scope of embodiments. For instance, the valve 82 may be located upstream of the valve 62. Further, output of the motorized compressor 60 may have other uses and/or connections with the wing anti-ice system 78 and/or other systems. The motorized compressor 60 may be located proximate to the gas turbine engine 10, below or within a pylon 84 (FIG. 3) that couples a nacelle of the gas turbine engine 10 to wing 80, or within the aircraft 5, for instance, when using fan-air source 56. Further, the engine bleed system 50 can be incorporated into the gas turbine engine 220 of FIG. 5, where engine bleed tap 52 can be coupled to a compressor source of a lower pressure compressor section (e.g., LPC section 229 or IPC section 230) before a highest pressure compressor section (HPC section 231) of the gas turbine engine 220 of FIG. 5, for example.

Figure 4:
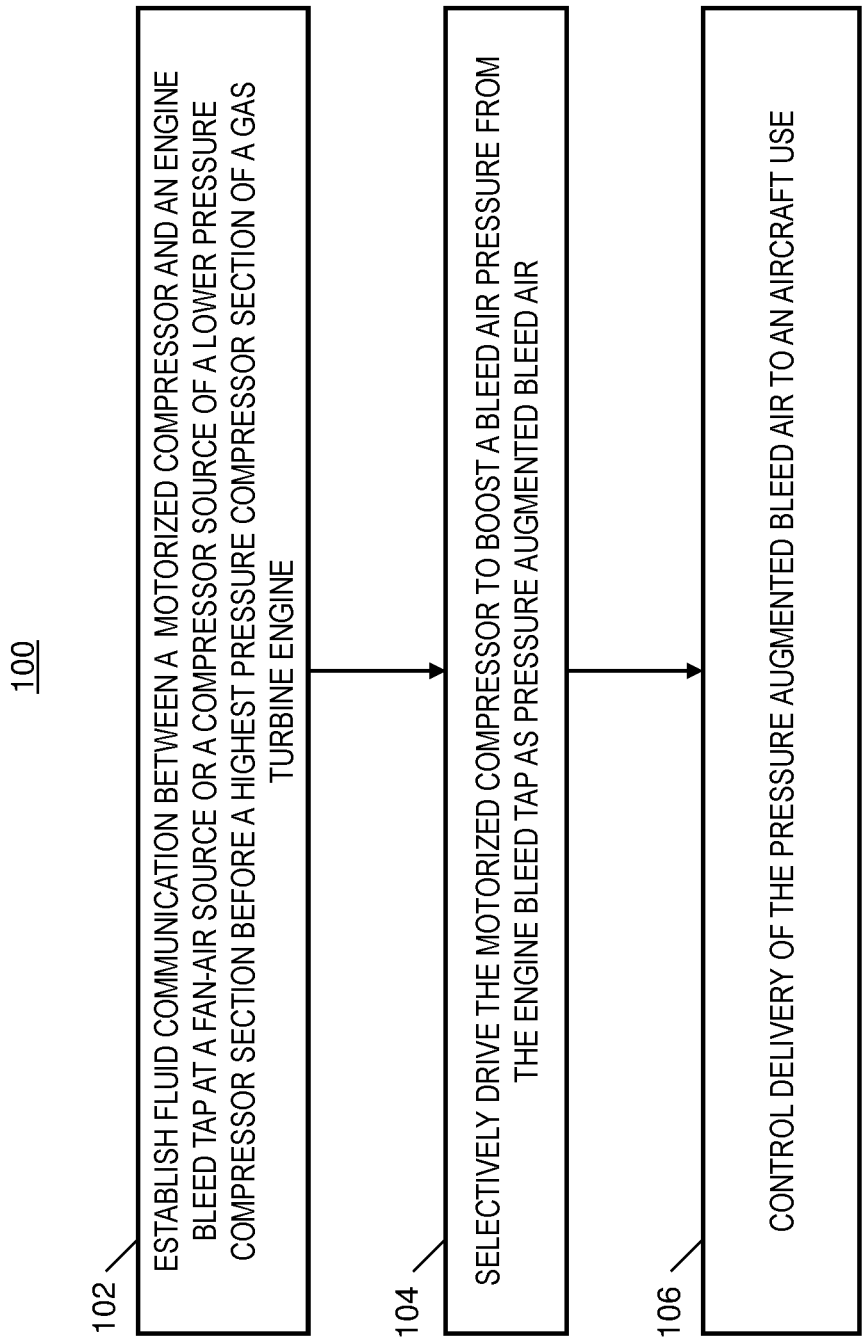
FIG. 4 is a process flow of a method according to embodiments of the disclosure.

FIG. 4 is a process flow of a method 100 according to an embodiment. The method 100 is described with reference to FIGS. 1-5. Although described primarily in reference to the gas turbine engine 10 of FIG. 1, it will be understood that the method 100 can also be applied to the gas turbine engine 220 of FIG. 5 and other configurations. At block 102, fluid communication is established between a motorized compressor 60 and an engine bleed tap 52 at a fan-air source 56 or a compressor source 54 of a lower pressure compressor section before a highest pressure compressor section of the gas turbine engine 10. At block 104, the motorized compressor 60 is selectively driven to boost a bleed air pressure from the engine bleed tap 52 as pressure augmented bleed air. At block 106, delivery of the pressure augmented bleed air to an aircraft use 64 is controlled by controller 48. Anti-icing can be from a pneumatic bleed 70 to a nacelle inlet 74 of the gas turbine engine 10. Power from an engine generator 46 can be provided to a wing anti-icing system 78 of the aircraft 10. Alternatively, controller 48 controls delivery of a portion of the pressure augmented bleed air to the wing anti-icing system 78 of the aircraft 5, e.g., using a combination of valves 62 and/or 82.

Technical effects and benefits include reducing engine bleed energy loss using a motorized compressor and a peak temperature limit. Embodiments draw engine bleed air from a low pressure compressor or fan air source and apply supplemental compression as needed to maintain pressure and temperature limits and avoid precooling the engine bleed air. Embodiments can eliminate the need for a precooler or additional heat exchanger by selectively boosting the temperature and pressure of engine bleed air while not exceeding the auto-ignition point of a fuel-air mixture. Embodiments can also eliminate a pressure regulating valve that may otherwise be used by system configurations which tap higher pressure bleed air sources.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. An engine bleed control system for a gas turbine engine of an aircraft, the engine bleed control system comprising:
   an engine bleed tap coupled to a fan-air source of the gas turbine engine, wherein the engine bleed tap is installed at a lower temperature engine stage such that, in use, extracted air is already pressurized greater than ambient;
   a motorized compressor comprising an electric motor, the motorized compressor in fluid communication with the engine bleed tap;
   a first valve operable to selectively establish a first flow from the engine bleed tap through the motorized compressor to supply pressure augmented bleed air to a duct, wherein the first valve is interposed between the engine bleed tap and the motorized compressor at an inlet of the motorized compressor;
   a check valve configured to limit a second flow between the engine bleed tap and the pressure augmented bleed air in the duct as a bypass path of the first flow around the motorized compressor;
   a second valve coupled to the duct and configured to control delivery of the pressure augmented bleed air to an aircraft use; and
   a controller configured to control the electric motor to selectively drive the motorized compressor to boost a bleed air pressure from the fan-air source through the first valve as the pressure augmented bleed air to mix with the second flow in the bypass path downstream of the check valve and control delivery of the pressure augmented bleed air through the second valve to the aircraft use by controlling the first valve and the second valve in combination with the motorized compressor while holding a maximum temperature of the pressure augmented bleed air below 400 degrees Fahrenheit (204 degrees Celsius) at all flight conditions of the aircraft and the gas turbine engine.

2. The engine bleed control system as in claim 1, wherein the aircraft use is an environmental control system of the aircraft.

3. The engine bleed control system as in claim 1, further comprising a pneumatic bleed for anti-icing at least a nacelle inlet of the gas turbine engine, wherein the pneumatic bleed is at a different engine stage than the engine bleed tap and a flow path of the engine bleed tap to generate the pressure augmented bleed air is independent from a flow path of the pneumatic bleed to the anti-icing of at least the nacelle inlet of the gas turbine engine.

4. The engine bleed control system as in claim 3, wherein a wing anti-icing system of the aircraft is powered by an engine generator.

5. The engine bleed control system as in claim 3, wherein the controller is operable to control delivery of a portion of the pressure augmented bleed air to an anti-icing system of the aircraft.

6. The engine bleed control system as in claim 1, wherein the motorized compressor is located within a pylon coupling a nacelle of the gas turbine engine to a wing of the aircraft.

7. The engine bleed control system as in claim 1, wherein the gas turbine engine is a geared turbofan engine comprising a geared drive mechanism configured to drive a fan responsive to rotation of a low pressure shaft coupled to a low pressure compressor, and the lowest pressure turbine powers an electric generator of the geared turbofan engine which in turn powers the electric motor of the motorized compressor.

8. An engine bleed control system for a gas turbine engine of an aircraft, the engine bleed control system comprising:
an engine bleed tap coupled to a compressor source of a lower pressure compressor section before a highest pressure compressor section of the gas turbine engine, wherein the engine bleed tap is installed at a lower temperature engine stage such that, in use, extracted air is already pressurized greater than ambient;
a motorized compressor comprising an electric motor, the motorized compressor in fluid communication with the engine bleed tap;
a first valve operable to selectively establish a first flow from the engine bleed tap through the motorized compressor to supply pressure augmented bleed air to a duct, wherein the first valve is interposed between the engine bleed tap and the motorized compressor at an inlet of the motorized compressor;
a check valve configured to limit a second flow between the engine bleed tap and the pressure augmented bleed air in the duct as a bypass path of the first flow around the motorized compressor;
a second valve coupled to the duct and configured to control delivery of the pressure augmented bleed air to an aircraft use; and
a controller configured to control the electric motor to selectively drive the motorized compressor to boost a bleed air pressure from the compressor source through the first valve as the pressure augmented bleed air to mix with the second flow in the bypass path downstream of the check valve and control delivery of the pressure augmented bleed air through the second valve to the aircraft use by controlling the first valve and the second valve in combination with the motorized compressor, while holding a maximum temperature of the pressure augmented bleed air below 400 degrees Fahrenheit (204 degrees Celsius) at all flight conditions of the aircraft and the gas turbine engine.

9. The engine bleed control system as in claim 8, wherein the aircraft use is an environmental control system of the aircraft, and the compressor source is located on a compressor section with equal to or fewer than eight stages of rotor blade and stator vane pairs from a fan section of the gas turbine engine.

10. The engine bleed control system as in claim 8, further comprising a pneumatic bleed for anti-icing at least a nacelle inlet of the gas turbine engine, wherein the pneumatic bleed is at a different engine stage than the engine bleed tap for an environmental control system of the aircraft, and a flow path of the engine bleed tap to generate the pressure augmented bleed air is independent from a flow path of the pneumatic bleed to the anti-icing of at least the nacelle inlet of the gas turbine engine.

11. The engine bleed control system as in claim 10, wherein a wing anti-icing system of the aircraft is powered by an engine generator.

12. The engine bleed control system as in claim 10, wherein the controller is operable to control delivery of a portion of the pressure augmented bleed air to an anti-icing system of the aircraft.

13. The engine bleed control system as in claim 8, wherein the gas turbine engine is a geared turbofan engine comprising a geared drive mechanism configured to drive a fan responsive to rotation of a low pressure shaft coupled to a low pressure compressor, and the lowest pressure turbine powers an electric generator of the geared turbofan engine which in turn powers the electric motor of the motorized compressor.

14. A method of controlling an engine bleed system for a gas turbine engine of an aircraft, the method comprising:
establishing fluid communication between a motorized compressor and an engine bleed tap at a fan-air source or a compressor source of a lower pressure compressor section before a highest pressure compressor section of the gas turbine engine, wherein the engine bleed tap is installed at a lower temperature engine stage such that, in use, extracted air is already pressurized greater than ambient, and establishing fluid communication further comprises:
controlling a first valve to selectively establish a first flow from the engine bleed tap through the motorized compressor to supply pressure augmented bleed air to a duct, wherein the first valve is interposed between the engine bleed tap and the motorized compressor at an inlet of the motorized compressor;
configuring a check valve to limit a second flow between the engine bleed tap and the pressure augmented bleed air in the duct as a bypass path of the first flow around the motorized compressor; and
controlling a second valve coupled to the duct to control delivery of the pressure augmented bleed air to an aircraft use;
controlling an electric motor to selectively drive the motorized compressor to boost a bleed air pressure from the engine bleed tap through the first valve as the pressure augmented bleed air to mix with the second flow in the bypass path downstream of the check valve; and
controlling delivery of the pressure augmented bleed air through the second valve to the aircraft use while holding a maximum temperature of the pressure augmented bleed air below 400 degrees Fahrenheit (204 degrees Celsius) at all flight conditions of the aircraft and the gas turbine engine.

15. The method as in claim 14, wherein the aircraft use is an environmental control system of the aircraft, and further comprising:
providing anti-icing from a pneumatic bleed to at least a nacelle inlet of the gas turbine engine, by controlling an anti-icing system valve, wherein the pneumatic bleed is at a different engine stage than the engine bleed tap, and a flow path of the engine bleed tap to generate the pressure augmented bleed air is independent from a flow path of the pneumatic bleed to the anti-icing of at least the nacelle inlet of the gas turbine engine.

16. The method as in claim 15, further comprising: controlling delivery of a portion of the pressure augmented bleed air to an anti-icing system of the aircraft.

17. The method as in claim 16, wherein the anti-icing system that receives a portion of the pressure augmented bleed air is a wing anti-icing system comprising wing anti-icing system valve coupled between the second valve and the aircraft use, the controlling delivery to the anti-icing system comprising control of the wing anti-icing system valve and control of the electric motor to adjust an output of the motorized compressor.

18. The method as in claim 15, further comprising: powering a wing anti-icing system of the aircraft using a generator driven by the gas turbine engine.

* * * * *